United States Patent
Ashley et al.

(10) Patent No.: US 6,254,048 B1
(45) Date of Patent: Jul. 3, 2001

(54) SOLENOID CLAMP

(75) Inventors: Gregory R. Ashley, Amherst; Duane R. Johnson, Wellington, both of OH (US)

(73) Assignee: AlliedSignal Truck Brake Systems Company, Elyria, OH (US)

( * ) Notice: Subject to any disclaimer, the term of this patent is extended or adjusted under 35 U.S.C. 154(b) by 0 days.

(21) Appl. No.: 09/386,023

(22) Filed: Aug. 30, 1999

(51) Int. Cl.[7] ....................................................... A47F 5/00
(52) U.S. Cl. ............................................. 248/300; 248/674
(58) Field of Search .................................... 248/300, 674, 248/689, 27.3, 200; 417/363

(56) References Cited

U.S. PATENT DOCUMENTS

| | | | |
|---|---|---|---|
| 1,206,645 | * | 11/1916 | Altman .................................. 248/200 |
| 4,566,865 | * | 1/1986 | Nishitsuji ........................... 248/300 X |
| 5,366,186 | * | 11/1994 | Weyeneth .............................. 248/27.3 |
| 5,649,812 | * | 7/1997 | Schenmeyr et al. .................. 248/628 |
| 5,826,836 | * | 10/1998 | Gallichan et al. ................... 248/27.3 |
| 5,885,024 | * | 3/1999 | Zupan et al. ...................... 248/300 X |
| 5,938,169 | * | 8/1999 | Ogawa et al. ......................... 248/674 |

OTHER PUBLICATIONS

U.S. application Ser. No. 09/108,053.

* cited by examiner

*Primary Examiner*—Leslie A. Braun
*Assistant Examiner*—Gwendolyn Baxter

(57) ABSTRACT

A single piece metal clamp is provided for. The clamp includes an upper portion having a cylindrical section and a cross member section integrally connected through spaced apart left and right legs. The clamp also includes a lower portion having a base with a plurality of through holes. The upper portion and lower portion are integrally connected by a pair of spaced apart left and right legs, each leg having a corresponding right angle formed therein.

10 Claims, 2 Drawing Sheets

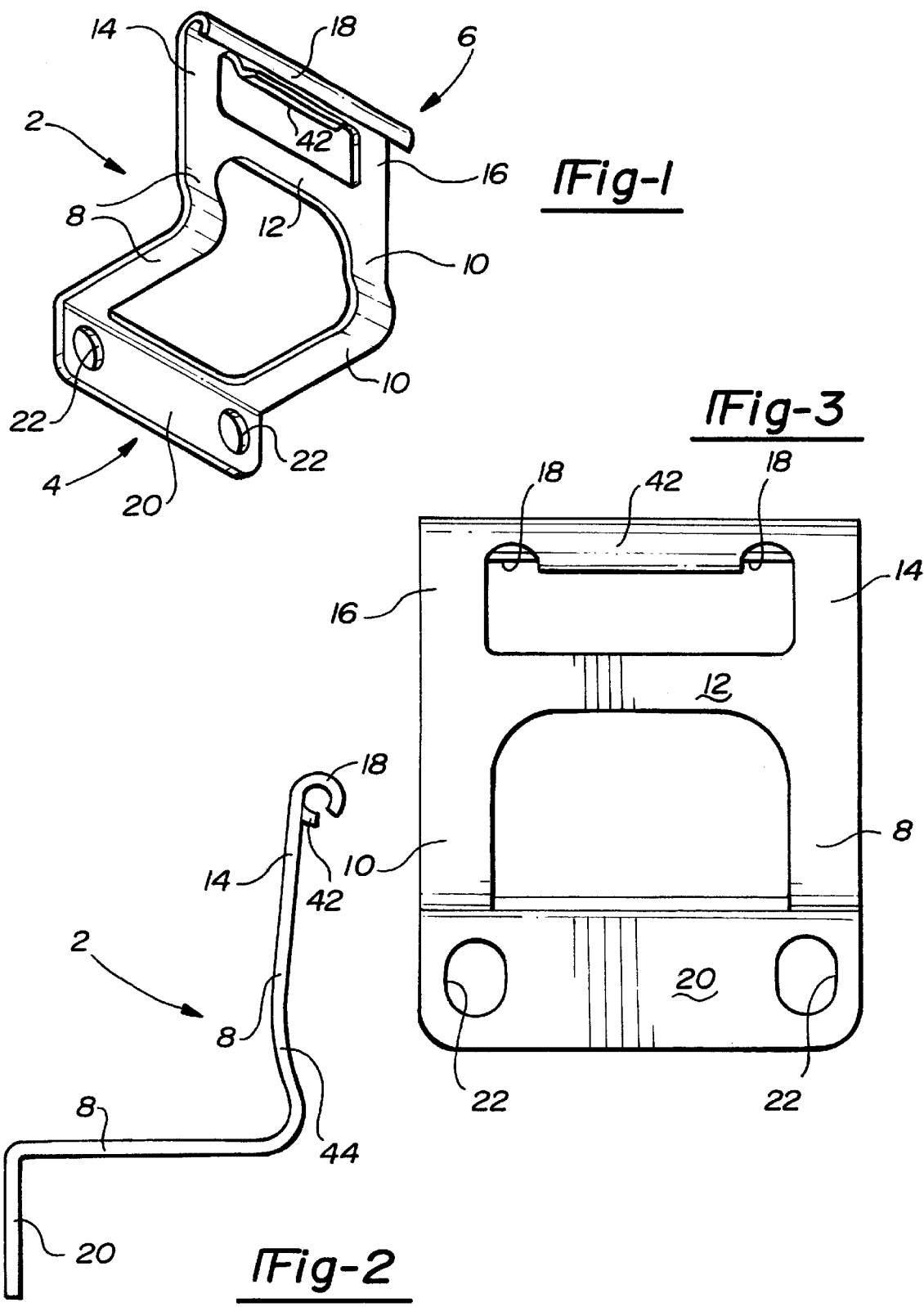

SOLENOID CLAMP

BACKGROUND OF THE INVENTION

This invention generally relates to motor vehicle components and, more particularly, to a component of an automotive anti-locking braking system.

In the automotive industry, heavy pieces of equipment, e.g. heavy duty trucks, tractors, trailers, and off road vehicles are often outfitted with braking systems operated by compressed air. Air brakes, as they are commonly referred to, use compressed air to actuate the vehicle brakes, thereby slowing and/or stopping the vehicle. Air brake systems can also be provided with an anti-locking feature that modifies the application of braking air pressure when impending wheel lock-up is sensed, which provides enhanced directional control of the vehicle during braking maneuvers.

A typical anti-lock air brake system is comprised of several components. A design of one of these components, referred to as an anti-lock modulator, is itself comprised of several components. The anti-lock modulator housing has a supply port, a delivery port, and an exhaust port internally connected through a series of air passageways. An exhaust diaphragm and a supply diaphragm are located within the air passage network of the housing. The flow of air through the ports and air passage network of the housing is controlled by an anti-lock system controller through two solenoids, one referred to as an exhaust solenoid, the other referred to as a supply solenoid. Interacting with the air passage network of the modulator housing, the solenoids provide the electropneumatic interface between the electronic anti-lock system controller and the air braking actuator.

In order to modify the brake application, coils of the two solenoid valves contained in the modulator are energized or deenergized in a preprogrammed sequence by the anti-lock controller. When the solenoid coil is energized, an armature within the solenoid moves, and depending upon the function of the specific solenoid, it either opens or closes thereby causing the exhaust or reapplication of air pressure to the brake actuator. The solenoids in the modulator are controlled independently by the electronic anti-lock controller. By opening and closing the solenoid valves in the modulator, the anti-lock controller is able to modify the brake application when wheel lock is detected or imminent.

The anti-lock modulator is positioned in tightly confined areas on a vehicle. These space limitations have caused the modulator housing to become more streamlined. As a result, there are no convenient means for attaching the dual solenoid pack that actuates the valves contained within the housing. Additionally, the solenoid pack needs to be robustly clamped to the housing with enough force to maintain its position without damaging the plastic material covering the solenoids.

Thus, it is highly desirable to provide a clamp that is strong enough to retain an object in position and that allows a housing to be positioned within a confined area.

It is also desirable to provide a clamp made of a single piece in order to reduce costs associated with producing a modulator housing assembly.

It is also desirable to provide a clamp made of a single piece capable of compensating for tolerance variations in component parts of a housing.

It is also desirable to provide a clamp requiring a reduced number of fasteners for attachment to a housing.

It is also desirable to provide a clamp that is easily removed from a housing providing access to an object being secured thereby.

It is also desirable to provide a single piece clamp capable of securing an object to a housing.

SUMMARY OF THE INVENTION

In accordance with the teaching of the present invention, a single piece solenoid clamp is provided. The clamp has an upper portion and a lower portion integrally connected by a pair of spaced apart legs. Each leg is bent so that a substantially 90° angle is formed. A lower portion of the clamp has a base containing two through holes. These holes are used to attach the clamp to a housing by means of threaded fasteners. An upper portion of the housing has a cross member that connects the spaced apart legs thereby providing additional structural support. The upper portion of the clamp also has a rounded portion having a circumference. The rounded portion and the cross member are integrally connected by a second pair of spaced apart legs.

A preferred embodiment of the present invention provides an effective means for securing an object to a housing. The upper rolled portion of the clamp allows one end of the clamp to be easily installed and securely located within a corresponding rounded portion of a housing without the use of additional fasteners. In a preferred embodiment, the spaced apart legs connecting the upper and lower portions of the clamp act as a leaf spring compensating for tolerances of the component parts. In a preferred embodiment, the leaf spring feature also limits the load transferred to the secured object, a solenoid assembly.

In a preferred embodiment, the clamp is removable, providing easy access to the secured object when service or replacement is necessary. After two threaded fasteners are removed from the lower portion, the cylindrical rounded end of the upper portion of the clamp allows the clamp to be rotated out of the way. Additionally, in a preferred embodiment, the relatively small size of the clamp allows the housing to be placed in a more confined area than was previously obtainable.

In a preferred embodiment, the clamp is formed in a single piece. This reduces production costs and assembly costs associated with the modulator housing assembly.

Other objects and advantages of the present invention will become apparent to those skilled in the art upon reading the following detailed description and upon reference to the following drawings.

BRIEF DESCRIPTION OF THE DRAWINGS

FIG. 1 is a perspective view of a clamp in accordance with a preferred embodiment of the invention;

FIG. 2 is a side view of the clamp depicted in FIG. 1;

FIG. 3 is a back view of the clamp depicted in FIG. 1;

DETAILED DESCRIPTION OF THE PREFERRED EMBODIMENT

Figure 4:
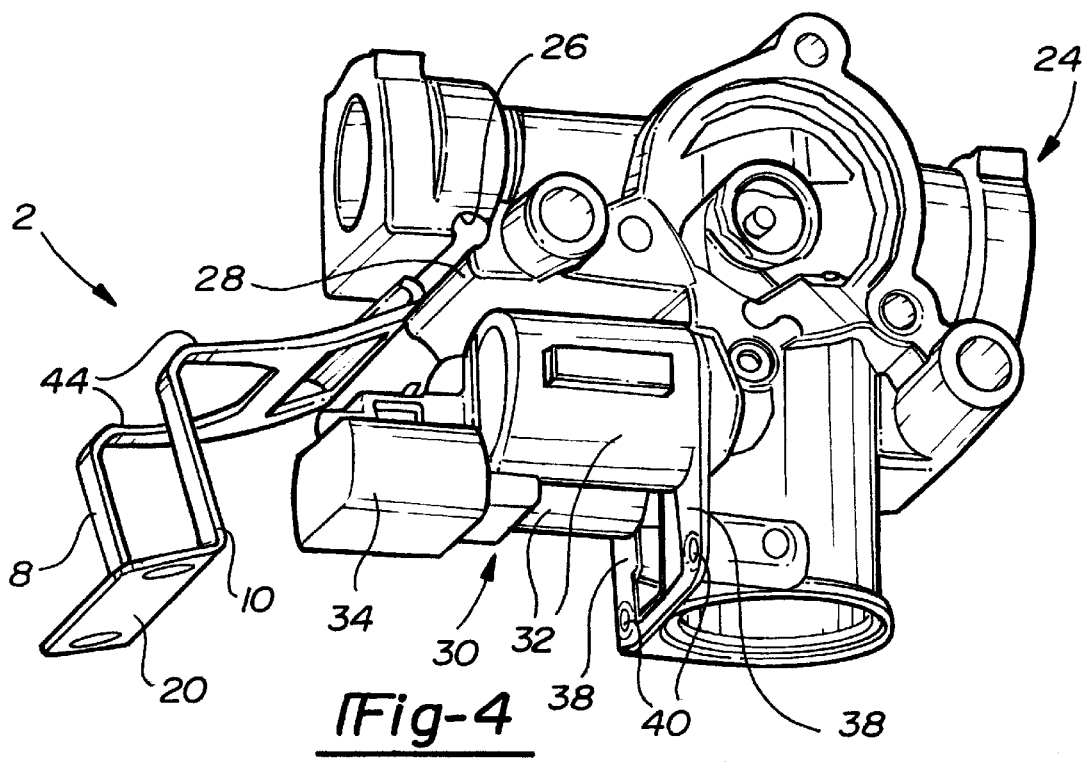
FIG 4. is a perspective view showing the clamp being attached to a housing; and, FIG. 5 is a perspective view showing the clamp attached to a housing after installation is complete.

The following description of the preferred embodiment is merely exemplary in nature and is in no way intended to limit the invention or its application or uses.

Referring to FIGS. 1 through 5, a solenoid clamp 2 is shown in accordance with a preferred embodiment of the present invention. Solenoid clamp 2 has a lower portion 4 and an upper portion 6. Lower portion 4 and upper portion 6 are connected by a set of integrally formed legs, left leg 8 and right leg 10. Left leg 8 and right leg 10 each has a substantially right angle formed therein, leaf spring section 44. The placement of leaf spring section 44 along left leg 8 corresponds to the placement of leaf spring section 44 on right leg 10. Sections 44 provide the spring force required to retain an object in place while allowing the clamp 2 to compensate for tolerance variations of other parts.

Upper portion 6 comprises a cross member 12. Cross member 12 adds additional structural support to legs 8 and 10. A second pair of spaced apart legs, a left leg 14 and a right leg 16, connect cross member 12 to a cylindrical section 18. Cylindrical section 18 has a circumference. A flange 42 is integrally formed at an end of cylindrical section 18.

Lower portion 4 comprises a base 20 having through holes 22. Base 20 is connected to an end of left leg 8 and is connected to a corresponding end of right leg 10 forming a substantially perpendicular angle. Threaded fasteners 36 secure lower portion 4 of clamp 2 to a planar surface 38 of housing 24 by frictionally engaging bores 40.

In a preferred embodiment, upper portion 6 and lower portion 4 are integrally connected to left leg 8 and right leg 10. It is specifically contemplated, however, that other methods of connecting upper portion 6 with lower portion 4 could be incorporated in additional embodiments of this invention and, as such, are within the scope of this disclosure.

Referring to FIG. 4, clamp 2 is shown being attached to modulator housing 24. Housing 24 has a rounded hole as defined by rounded surface 26. Rounded surface 26 has a circumference. A portion of the circumference has been removed, exposing tab 28. Cylindrical section 18 permits the upper portion 6 of clamp 2 to be inserted into rounded surface 26. Once inserted, cylindrical section 18 allows clamp 2 to be rotated into position around solenoids 32.

Figure 5:
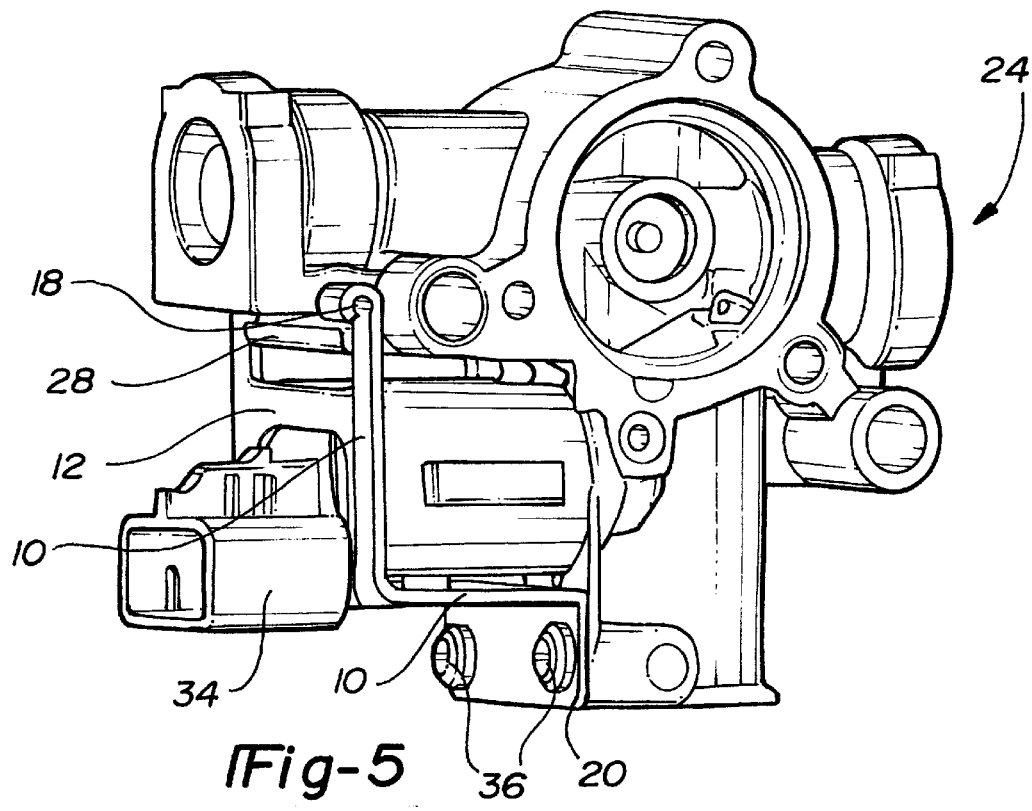

Referring to FIG. 5, solenoid assembly 30 is shown installed in housing 24. Solenoid assembly 30 consists of solenoids 32 and connector 34. Left leg 8 and right leg 10 of clamp 2 are spaced apart such that connector 34 will pass through between left leg 8 and right leg 10 of clamp 2 when installation is complete. Housing 24 is provided with planar surface 38. Bores 40 are located on planar surface 38. When clamp installation is complete, planar surface 38 meets with base 20 of clamp 2. The positioning of bores 40 on planar surface 38 corresponds to the placement of through holes 22 on base 20.

After installation, cylindrical section 18 of clamp 2 engages rounded surface 26 of housing 24. Left leg 14 and right leg 16 extend downward adjacent to the sides of tab 28. This prevents side-to-side movement of clamp 2 after installation is complete. Fasteners 36 secure lower portion 4 to the housing 24. Leaf spring sections 44 of legs 8 and 10 provide the upper sections of legs 8 and 10 with enough clamping force to tightly secure the solenoids in position on planar surface 38 without damaging the plastic material encasing solenoids 32. Additionally, leaf spring section 44 allows the clamp to compensate for tolerance variations in the component parts of housing 24 and solenoid assembly 30.

Typically, fasteners 36 and bores 40 will be threaded. However, any method of securing the lower portion 4 of clamp 2 to the planar surface 38 of housing 24 capable of withstanding conditions typically found in an automotive environment is specifically contemplated and within the scope of this disclosure. These securing methods include, but are not limited to, riveting, welding, and bolting.

Additionally, in a preferred embodiment, a plurality of fasteners is disclosed. However, it is specifically contemplated that any number of fasteners could be used and, as such, is within the scope of this disclosure.

Clamp 2, as described in a preferred embodiment, is made of a stainless steel material. However, any type of material capable of providing the required amount of spring load or clamping force and capable of withstanding conditions typically found in an automotive environment is specifically contemplated and within the scope of this disclosure.

The foregoing discussion discloses and describes a preferred embodiment of the present invention. One skilled in the art will readily recognize from such discussion and from the accompanying drawings and claims, that various changes, modifications, and variations can be made therein without departure from the true spirit and fair scope of the invention as defined in the following claims.

We claim:

1. A clamp assembly comprising:
    a housing, said housing having a rounded surface having a circumference, said rounded surface having a portion of its circumference removed exposing a tab extending from an end of said rounded surface;
    a substantially planar surface located on said housing a distance from said rounded surface, said substantially planar surface having at least one bore;
    a clamp, said clamp having an upper portion and a lower portion and a pair of spaced apart legs,
        said upper portion having a rounded end, said rounded end having a circumference corresponding to said circumference of said rounded surface of said housing such that said rounded end of said upper portion is frictionally retained within said rounded surface of said housing,
        said lower portion having a base, said base having a substantially planar region corresponding to said planar surface of said housing, said base also having at least one through hole, said at least one through hole being positioned on said base in a location corresponding to said positioning of said at least one bore on said planar surface of the housing;
        said pair of spaced apart legs having a first and a second end, said pair of legs connecting said upper portion and said lower portion.

2. The clamp assembly of claim 1, wherein each leg of said pair of spaced apart legs has an angle formed therein.

3. The clamp assembly of claim 2, wherein said angle formed in each leg is a substantially right angle; and,
    said base is connected to said first end of said pair of spaced apart legs such that a substantially perpendicular angle is formed by said base and said legs.

4. The clamp assembly of claim 3, wherein said upper portion further comprises:
    a cross member connected to each leg at said second end of said pair of spaced apart legs; and,
    said rounded end of said upper portion connected to said cross member by a second pair of spaced apart legs.

5. The clamp assembly of claim 4, wherein said rounded end of said upper portion and said second pair of spaced apart legs contacts said tab extending from an end of said rounded surface of said housing when said clamp is placed in an installed position.

6. The clamp assembly of claim 1, wherein said base is connected to one end of said pair of spaced apart legs such that a substantially perpendicular angle is formed by said base and said legs.

7. The clamp assembly of claim 6, wherein said upper portion further comprises a cross member connected to each leg of said pair of legs; and, said rounded end of said upper portion is connected to said cross member by a second pair of spaced apart legs.

8. The clamp assembly of claim 1, wherein said upper portion further comprises a cross member connected to each leg of said pair of legs.

9. The clamp assembly of claim 8, wherein said rounded end of said upper portion is connected to said cross member by a second pair of spaced apart legs.

10. A clamp, adapted to be mounted to a housing having a rounded surface with a portion of its circumference removed exposing a tab extending from an end of the rounded surface, the housing also including a substantially planar region located a distance away from the rounded surface, the planar region including at least one bore, the housing also having an object to be secured, said clamp comprising:

a means for frictionally engaging the rounded surface and tab of the housing;

a means for anchoring to the substantially planar region of the housing; and, a means for connecting said frictional connecting means to said anchoring means, said connecting means compensating for tolerance variations in said anchoring means, said engaging means, and the housing, said connecting means limiting any load transferred to the object being secured.

\* \* \* \* \*